(12) United States Patent
Liu

(10) Patent No.: US 7,933,366 B2
(45) Date of Patent: Apr. 26, 2011

(54) CHANNEL ESTIMATION METHOD AND SYSTEM USING LINEAR CORRELATION BASED INTERFERENCE CANCELLATION (LCIC) COMBINED WITH DECISION-FEEDBACK-EQUALIZATION (DFE)

(75) Inventor: Guanghui Liu, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1026 days.

(21) Appl. No.: 11/744,627

(22) Filed: May 4, 2007

(65) Prior Publication Data

US 2008/0049600 A1 Feb. 28, 2008

(30) Foreign Application Priority Data

Aug. 12, 2006 (KR) ........................ 10-2006-0076484

(51) Int. Cl.
*H03D 1/00* (2006.01)
*H04L 27/06* (2006.01)

(52) U.S. Cl. ........ 375/343; 375/233; 375/142; 375/144; 375/148; 375/150; 324/618; 704/216; 704/217; 704/218; 704/219; 359/561

(58) Field of Classification Search ................ 375/343, 375/233, 142, 144, 148, 150; 324/618; 704/216, 704/217, 218, 219; 359/561
See application file for complete search history.

(56) References Cited

U.S. PATENT DOCUMENTS

| 5,533,067 A * | 7/1996 | Jamal et al. | 375/341 |
| 2002/0181549 A1 | 12/2002 | Linnartz et al. | |
| 2003/0099309 A1 * | 5/2003 | Fimoff et al. | 375/340 |
| 2004/0202229 A1 * | 10/2004 | Raphaeli et al. | 375/145 |

FOREIGN PATENT DOCUMENTS

| JP | 2002-330113 | 11/2002 |
| KR | 1020040074761 | 8/2004 |
| KR | 1020060001646 | 1/2006 |

OTHER PUBLICATIONS

Song, B., "On Channel Estimation and Equalization in TDS-OFDM based Terrestrial HDTV Broadcasting System", Aug. 2005, Consumer Electronics, IEEE Transaction, vol. 51, pp. 790-797.*

* cited by examiner

*Primary Examiner* — Mohammad H Ghayour
*Assistant Examiner* — Sung Ahn
(74) *Attorney, Agent, or Firm* — F. Chau & Associates, LLC

(57) ABSTRACT

A channel estimation method and system using linear correlation based interference cancellation combined with decision-feedback-equalization (LCIC-DFE) are provided. The channel estimation method includes generating a first correlation sequence by calculating a linear correlation between a baseband sampled complex signal and a locally stored pseudo-noise signal and obtaining a second correlation sequence by iteratively removing inter-path interference from the first correlation sequence and generating a first channel impulse response (CIR) sequence based on the second correlation sequence. And, obtaining a third correlation sequence by removing random-data interference from the second correlation sequence based on the first CIR sequence and a feedback signal and generating a second CIR sequence based on the third correlation sequence.

18 Claims, 9 Drawing Sheets

FIG. 6

Table I
System Simulation Parameters

| | |
|---|---|
| Symbol Rate $f_s$ | 7.56MSPS |
| Signal Constellation | 64QAM |
| FFT size $N_c$ | 3780 |
| Subcarrier Spacing | 2KHz |
| PN Head Length $L_{PN}$ | 420 |

FIG. 7

Table II
CT8 Channel Profile

| Path Number | Delay Time (μs) | Relative Power(dB) |
|---|---|---|
| 1 | 0.0 | −18 |
| 2 | 1.8 | 0 |
| 3 | 1.95 | −20 |
| 4 | 3.6 | −20 |
| 5 | 7.5 | −10 |
| 6 | 31.8 | 0 |

CHANNEL ESTIMATION METHOD AND SYSTEM USING LINEAR CORRELATION BASED INTERFERENCE CANCELLATION (LCIC) COMBINED WITH DECISION-FEEDBACK-EQUALIZATION (DFE)

CROSS-REFERENCE TO RELATED PATENT APPLICATION

This application claims priority under 35 U.S.C. §119 to Korean Patent Application No. 10-2006-0076484, filed on Aug. 12, 2006, the disclosure of which is herein incorporated by reference in its entirety.

BACKGROUND OF THE INVENTION

1. Field of the Invention

The present invention relates to an Orthogonal Frequency Division Multiplexing (OFDM) communication system, and more particularly, to a channel estimation method and system for estimating a channel in the time domain by calculating a linear correlation and repeatedly canceling adjacent channel interference using Decision-Feedback-Equalization (DFE).

2. Description of the Related Art

Orthogonal Frequency Division Multiplexing (OFDM) is a multi-carrier modulation, in which data to be transmitted is converted into an M-ary QAM (Quadrature Amplitude Modulation) modulated complex symbol or a sequence of complex symbols. A complex symbol sequence is converted into a plurality of parallel (simultaneous) complex symbols through serial-to-parallel conversion, and the parallel complex symbols are shaped with a rectangular pulse and modulated on a subcarrier. In multi-carrier modulation, a frequency spacing between subcarriers is set such that subcarrier modulated parallel (simultaneous) complex symbols are orthogonal to each other, and thus do not inherently interfere with each other.

A typical wireless channel may include multiple paths of different effective lengths, each introducing a different delay to a portion of a transmitted signal following that path. Inter symbol interference (ISI) refers to the effect of neighboring symbols on the current symbol and unless it is compensated for properly it can lead to high Bit Error Rates (BER) at the receiver. Therefore, various methods have been developed to increase the communications systems' performance by reducing the effects of the ISI. In a case where an M-ary QAM signal is transmitted through a wireless "fading" channel without using OFDM, if a delay spread occurring due to multipath delay in the channel is greater than the symbol period of the QAM signal, inter-symbol interference (ISI) occurs and hinders a receiver from restoring the signal normally. For this reason, it is necessary to use an equalizer to compensate for a random multipath delay spread. However, it is very complicated to implement this equalizer in the receiver, and also, transmission performance may be degraded due to input noise.

On the other hand, when OFDM is used, since the period of each parallel (simultaneous) complex symbol can be set to be much longer than a delay spread of a channel, inter-symbol interference (ISI) can be greatly reduced. In particular, when a guard interval is set to be longer than the delay spread, inter-symbol interference (ISI) can be completely avoided. Also, when a guard interval is set to be longer than the delay spread, it is unnecessary to implement an equalizer that compensates for a random delay spread caused by multipath delay. OFDM has proven to be very effective for data transmission through a wireless fading channel and has thus been adopted as a standard transmission mode for terrestrial digital television (DTV) and digital audio broadcasting systems in Europe. In addition, OFDM is used very often in data transmission systems using wired channels such as digital subscriber loops (DSLs) and powerline communications in order to alleviate degradation of transmission performance due to multipath reflection occurring in a wired line network environment.

A transmitter in a data transmission system using OFDM includes a channel encoding unit, a modulation unit, and a transmitter channel matching unit. The channel encoding unit converts data to be transmitted into coded data. The modulation unit which converts the coded data into a complex symbol sequence using a mapper. The complex symbol sequence may be M-ary QAM, M-ary phase shift keying (PSK), differential PSK (DPSK) or the like, and converts the sequence of complex symbols into a plurality of parallel (simultaneous) complex symbols through serial-to-parallel conversion, shapes the parallel complex symbols with a rectangular pulse, modulates them on a subcarrier, and modulates the sum of subcarrier modulated signals on a carrier. The transmitter channel matching unit includes an amplifier and an antenna to transmit the carrier modulated signal through a wireless or wired channel.

A corresponding receiver includes a receiver channel matching unit, a demodulation unit, and a channel decoding unit. The channel encoding unit uses convolutional encoding, block encoding, turbo encoding, or other encoding methods, or a combination thereof.

To perform rectangular pulse shaping of the plurality of parallel (simultaneously transmitted) complex symbols and subcarrier modulation, an Inverse Fast Fourier Transform (IFFT) signal processor is implemented in the transmitter's modulation unit based on sampling theorem. A corresponding Fast Fourier Transform (FFT) signal processor is used in the receiver.

In the transmitter of a data transmission system using OFDM, coded data is converted into a complex symbol sequence by the mapper. Due to the operation of a frequency interleaver in the transmitter and a frequency deinterleaver in the receiver, adjacent complex symbols are independently affected by fading. Accordingly, coded data restored in the receiver is prevented from serious performance degradation due to burst loss. However, an information loss probability due to lading is still high, and therefore, degradation of transmission performance is higher than in data transmission through an unfading channel.

Meanwhile, in OFDM using a plurality of orthogonal subcarriers, each subcarrier demodulated in the receiver appears as the product of a data symbol and of frequency nonselective fading (i.e., a frequency response with respect to the subcarrier).

In OFDM using coherent modulation, during data detection, channel fading distortion is estimated with respect to each subcarrier and a result of the estimation is used as a coefficient of a single-tap equalizer to remove fading distortion from the demodulated subcarrier. During this data detection, channel estimation is essential to detection performance and thus has been researched and extensively employed.

For the purpose of facilitating channel estimation in OFDM, a pseudo-noise (PN) sequence is inserted as an equalizer training symbol into a transmitted signal frame and the channel impulse response (CIR) (the channel's fading distortion) is estimated abased upon the measured correlation between the transmitted-received PN sequence and a known local copy of the PN stored in the receiver.

In Time-Domain Synchronous (TDS) OFDM systems, a PN sequence rather than cyclical prefixes (CP) is inserted between data blocks as a guard interval because the PN sequence is also utilized as an equalizer training symbol at an OFDM receiver and thus spectrum efficiency is higher than in OFDM systems using only a CP.

Methods of estimating a channel impulse response (CIR) using a PN sequence (e.g., based on a cyclical (continuous) correlation between a baseband sampled complex signal received by a receiver and local stored PN) have been introduced by B. W. Song, L. Gui, Y. F. Guan, and W. J. Zhang ["On Channel Estimation and Equalization in TDS-OFDM based Terrestrial HDTV Broadcasting System", IEEE Trans. Consumer Electronics, vol. 51, no. 3, pp. 790-797, August 2005] and J. Wang, Z. X. Yang, C. Y. Pan, J. Song, and L. Yang ["Iterative Padding Subtraction of the PN Sequence for the TDS-OFDM over Broadcast Channels", IEEE Trans. Consumer Electronics, vol. 51, no. 4, pp. 1148-1152, November 2005].

In the method introduced by B. W. Song et al., CIR is estimated by detecting a correlation peak in the time domain. However, this method can be used only when a maximum channel time-delay spread is smaller than the sum of the length of a pre-amble and the length of a post-amble, which are respectively attached before and after a PN sequence in a transmitted signal. (See FIG. 1)

Linear equalization does not exploit the fact that the transmitted PN equalizer training sequence has a "finite alphabet" structure. Decision Feedback Equalization (DFE) exploits the fact that the transmitted PN sequence has a "finite alphabet" structure. To take advantage of this property, the decision feedback equalizers use past decisions to (iteratively) improve the equalizer performance. When a (Decision-Feedback-Equalization) DFE iteration is used to estimate long-delay echoes, computation is complicated and desirable performance cannot be accomplished. When the method introduced by J. Wang et al. is used, conversion between the time domain and the frequency domain occurs very often, which results in significant complexity. In addition, desirable performance cannot be accomplished even after many DFE iterations. In other words, conventional channel estimation methods using a cyclical correlation have a very high computation complexity and do not appropriately cancel interference during CIR estimation, thus causing a significant loss in performance.

SUMMARY OF THE INVENTION

A channel estimation method using a linear correlation and DFE is disclosed. The present invention provides a channel estimation method and system, having a low computation complexity, able to appropriately cancel interference during CIR estimation and providing more accurate CIR estimation, using linear correlation based interference cancellation combined with decision-feedback-equalization (LCIC-DFE).

According to an aspect of the present invention, there is provided, an OFDM receiver comprising a system for performing channel estimation using linear correlation based interference cancellation (LCIC) and decision-feedback-equalization (DFE). The channel estimation system includes: a linear correlator configured to receive a baseband sampled complex signal and to generate a first correlation sequence by calculating the linear correlation between the baseband sampled complex signal and a locally stored pseudo-noise signal; and a CIR estimator adapted to remove inter-path interference and remove random-data interference from the first correlation sequence.

According to another aspect of the present invention, there is provided a channel estimation method using LCIC-DFE. The channel estimation method includes (a) calculating a linear correlation between a baseband sampled complex signal and a local pseudo-noise signal and generating a first correlation sequence; and (b) iteratively removing inter-path interference from the first correlation sequence and generating a first channel impulse response (CIR) sequence based on a second correlation sequence obtained after the inter-path interference is removed.

The channel estimation method may further include (c) generating a feedback signal based on the first CIR sequence, the baseband sampled complex signal, and a symbol synchronization signal generated based on the first correlation sequence; and (d) removing random-data interference from the second correlation sequence based on the first CIR sequence and the feedback signal and generating a second CIR sequence based on a third correlation sequence obtained after the random-data interference is removed.

The channel estimation method may further include returning to step (b) using the third correlation sequence.

Step (b) may include (b1) defecting a peak having a amplitude equal to or greater than a predetermined threshold in the first correlation sequence and generating an observation vector; (b1) generating a CIR sequence based on the observation vector; (b3) removing the inter-path interference from the first correlation sequence based on the CIR sequence; and (b4) lowering the predetermined threshold value to a predetermined reference when the predetermined threshold is greater than an initial threshold and going back to step (b1).

The initial threshold $th_1$ of the predetermined threshold $th_j$ may be a value obtained by dividing $â(\tau_{max})$ by M, where "j" is an index indicating the number of iterations of step (b), M is a predetermined number allowing the initial threshold $th_1$ to be greater than a maximum parasitical peak, and the maximum parasitical peak is $(â(\tau_{max}))*L_{pre}/L_{PN}$ or $(â(\tau_{max}))*L_{post}/L_{PN}$. The predetermined reference may be defined as $th_j=th_{j+1}/M$.

Step (c) may include (c1) removing a frame head from the baseband sampled complex signal based on the symbol synchronization signal and the CIR sequence and recovering a cyclical convolution between frame body data in the baseband sampled complex signal and a current channel CIR to generate a recovered frame body; (c2) performing fast Fourier transform on the recovered frame body to generate a fast Fourier transformed signal, (c3) performing zero-padding on the CIR sequence and performing discrete Fourier transform on a zero-padded sequence to generate a discrete Fourier transformed signal; (c4) performing channel equalization based on the fast Fourier transformed signal and the discrete Fourier transformed signal to generate an equalized signal; and (c5) performing hard-decision on the equalized signal to generate a hard-decision signal.

Alternatively, step (c) may include (c1) removing a frame head from the baseband sampled complex signal based on the symbol synchronization signal and the CIR sequence and recovering a cyclical convolution between frame body data in the baseband sampled complex signal and a current channel CIR to generate a recovered frame body; (c2) performing fast Fourier transform on the recovered frame body to generate a fast Fourier transformed signal; (c3) performing zero-padding on the CIR sequence and performing discrete Fourier transform on a zero-padded sequence to generate a discrete Fourier transformed signal; (c4) performing channel equalization based on the fast Fourier transformed signal and the discrete Fourier transformed signal to generate an equalized signal, and (c6) performing channel decoding on the equalized signal to generate a decoded signal.

Step (b2) may include calculating a CIR coefficient corresponding to the detected correlation peak greater than the predetermined threshold.

Step (b3) may include canceling the inter-path interference from the first correlation sequence based on the observation vector to reduce an error in peak detection during a subsequent iteration.

According to another aspect of the present invention, there is provided a channel estimation system using LCIC-DFE. The channel estimation system includes a linear correlator receiving a baseband sampled complex signal and a local pseudo-noise signal and calculating a linear correlation between the baseband sampled complex signal and the local pseudo-noise signal to generate a first correlation sequence, a symbol synchronization unit receiving the first correlation sequence and outputting an orthogonal frequency division multiplexing (OFDM) symbol synchronization signal; and a CIR estimator receiving the first correlation sequence, the symbol synchronization signal, and a feedback signal, estimating a CIR based on the first correlation sequence, the symbol synchronization signal, and the feedback signal, and outputting a first CIR sequence corresponding to a result of the estimation. The CIR estimator iteratively detects a maximum cross-correlation value in the first correlation sequence, which has been received, using a thresholding method, iteratively removes the detected maximum cross-correlation value to remove inter-path interference from the first correlation sequence, removes random-data interference from a second correlation sequence, obtained after the inter-path interference is removed, based on a convolution between the first CIR sequence and the feedback signal, and outputs a second CIR sequence based on a third correlation sequence obtained after the random-data interference is removed.

The channel estimation system may further include a fast Fourier transform unit performing fast Fourier transform on the recovered frame body output from the pseudo-noise removal unit and outputting a fast Fourier transformed signal; a discrete Fourier transform unit performing zero-padding on the first CIR sequence output from the CIR estimator, performing discrete Fourier transform on a zero-padded CIR sequence, and outputting a discrete Fourier transformed signal; a channel equalizer performing channel equalization based on the fast Fourier transformed signal and the discrete Fourier transformed signal and outputting an equalized signal; a hard-decision unit performing hard-decision on the equalized signal received from the channel equalizer and outputting a hard-decision signal; and a decoding unit performing channel decoding on the equalized signal received from the channel equalizer and outputting a decoded signal.

The feedback, signal may be the hard-decision signal output from the hard-decision unit or the decoded signal output from the decoding unit.

The channel estimation system may be included in an OFDM receiver.

The attached drawings for illustrating preferred embodiments of the present invention are referred to in order to convey a sufficient understanding of the present invention.

BRIEF DESCRIPTION OF THE DRAWINGS

The above and other features of the present invention will become more apparent by describing in detail preferred embodiments thereof with reference to the attached drawings in which like reference numerals in the drawings denote like elements, and:

FIG. 6 lists parameters used to simulate a channel estimation system according to an embodiment of the present invention;

FIG. 7 tabulates a profile used to simulate the channel estimation system using the parameters illustrated in FIG. 6 in a China Test 8th (CT8) channel model;

DETAILED DESCRIPTION OF EXEMPLARY EMBODIMENTS OF THE INVENTION

Figure 1:
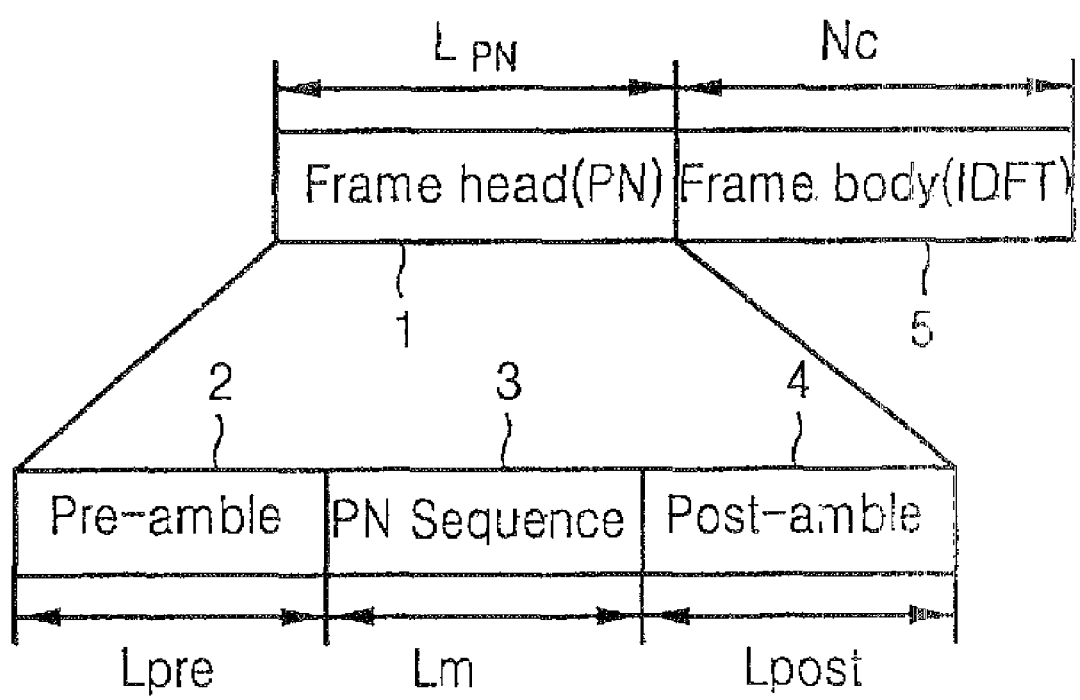
FIG. 1 illustrates the structure of an Orthogonal Frequency Division Multiplexing (OFDM) transmitted signal according to an embodiment of the present invention.

FIG. 1 illustrates the structure of an Orthogonal Frequency Division Multiplexing (OFDM) transmitted signal according to an embodiment of the present invention. The OFDM transmitted signal includes a frame head 1 including pseudo-noise (PN) and a frame body 5 corresponding to Inverse Discrete Fourier Transformed (IDFT) data block.

The frame head 1 includes a pre-amble 2, a PN sequence 3, and a post-amble 4. Reference characters $L_{PN}$, $L_{pre}$, $L_m$, and $L_{post}$ respectively denote the length of the frame head 1, the length of the pre-amble 2, the length of the PN sequence 3, and the length of the post-amble 4. The PN sequence 3 is generated based on an m-sequence method, i.e., a maximal length sequence method. The pre-amble 2 and the post-amble 4 are generated by the cyclical extension of the PN sequence 3. For example, when $L_{PN}=255$, $L_{pre}=83$, and $L_{post}=82$, the pre-amble 2 corresponds to 173rd through 255th signals in the PN sequence 3 and the post-amble 4 corresponds to first through 82nd signals in the PN sequence 3.

Figure 2:
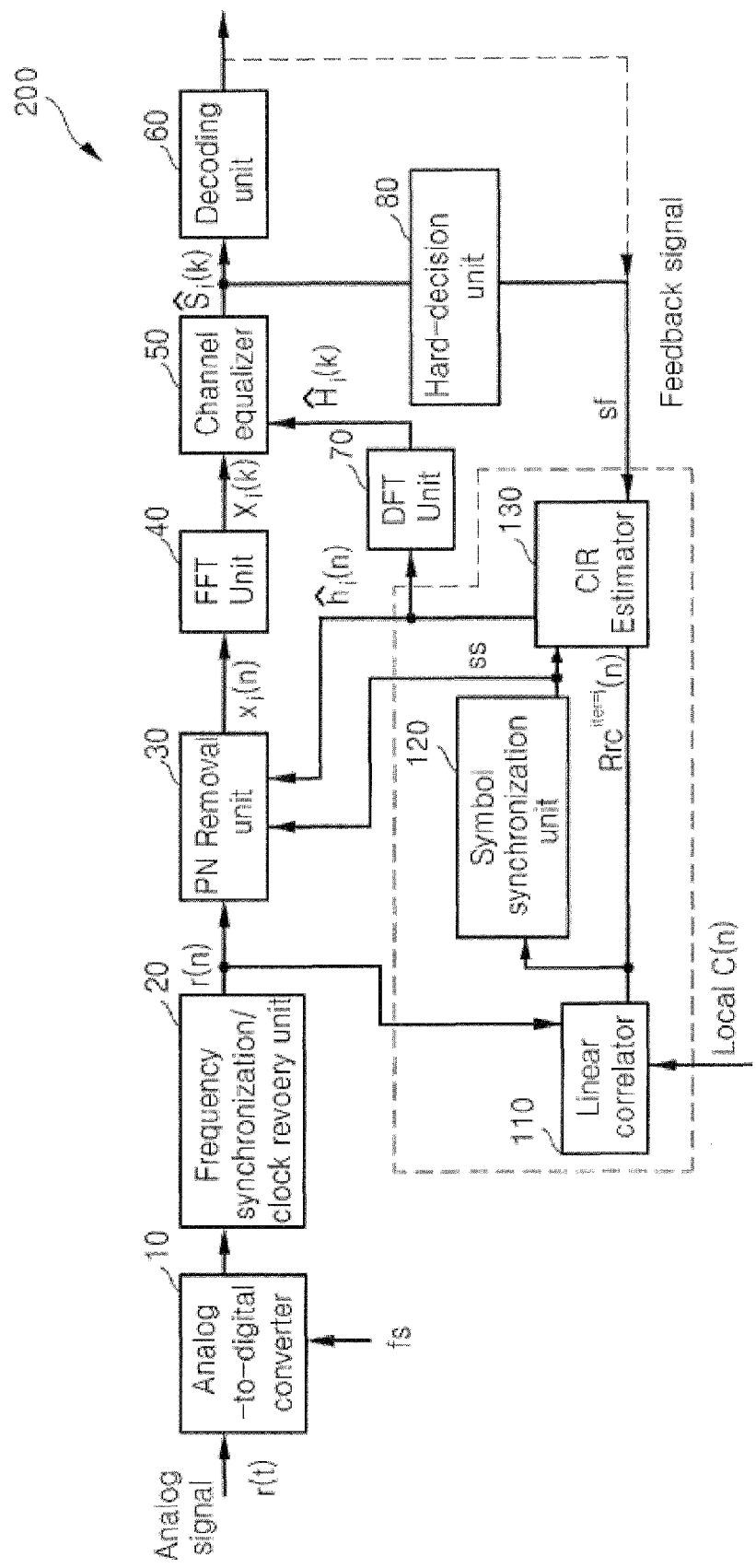
FIG. 2 is a block diagram of a channel estimation system according to an embodiment of the present invention.

FIG. 2 is a block diagram of a channel estimation system 200 according to an embodiment of the present invention. The channel estimation system 200 includes a linear correlator 110, the symbol synchronization unit 120, and a channel impulse response (CIR) estimator 130. The channel estimation system 200 may further include a PN removal unit 30 and may further include an analog-to-digital converter 10 and a frequency synchronization/clock recovery unit 20. Also, the channel estimation system 200 may further include a Fast Fourier Transform (FFT) unit 40, a channel equalizer 50, a decoding unit 60, a Discrete Fourier Transform (DFT) unit 70, and a hard-decision unit 80. The channel estimation system 200 may be implemented within an OFDM receiver.

The linear correlator 110 receives a baseband sampled complex signal r(n) and a local PN signal C(n) and calculates a linear correlation therebetween to generate a linear correlation sequence Rrc(n). The baseband sampled complex signal r(n) is obtained when an analog signal r(t) input to the channel estimation system 200 is sampled at a frequency fs=1/Ts. At this time, Ts=Tu/Nc where Nc is the number of OFDM symbols included in the frame body 5 and Tu is an overall period of Nc OFDM symbols.

The symbol synchronization unit 120 receives the linear correlation sequence Rrc(n) and outputs an OFDM symbol synchronization signal ss based on the linear correlation sequence Rrc(n).

The CIR estimator 130 receives the linear correlation sequence Rrc(n), the symbol synchronization signal ss, and a feedback signal sf, estimates CIR based on the received three signals, and outputs a CIR sequence $\hat{h}_i(n)$ (where "i" is an index of a received OFDM symbol) corresponding to a result of the estimation. The feedback signal sf may be a signal generated when Decision-Feedback-Equalization (DFE) is performed.

The CIR estimator 130 detects a maximum of a cross-correlation value in the linear correlation sequence Rrc(n) using a thresholding method and removes the detected maximum cross-correlation value from the linear correlation sequence Rrc(n) in iterations, thereby removing inter-path interference (IPI) from the linear correlation sequence Rrc(n). In addition, the CIR estimator 130 removes random-data interference (similar to noise) from the linear correlation sequence Rrc(n) based on the convolution between the CIR sequence $\hat{h}_i(n)$ and the feedback signal sf. Thereafter, the CIR estimator 130 outputs a CIR sequence based on the linear correlation sequence Rrc(n) from which the inter-path interference (IPI) and the random-data interference have been removed.

In more detail, the linear correlation sequence Rrc(n) has three types of interference: one is inter-path interference (IPI) occurring due to an abnormal cross-correlation of a frame head; another is random-data interference occurring in a frame body; and the other is channel Additive Gaussian White Noise (AWGN). The inter-path interference (IPI) affects CIR estimation more than the other two types of interference. The inter-path interference (IPI) can be cancelled by iteratively detecting a maximum cross-correlation value and removing it from the linear correlation sequence Rrc(n). The random-data interference can be cancelled by the CIR estimator 130 based on the convolution between the CIR sequence $\hat{h}_i(n)$ and the feedback signal sf. The CIR sequence $\hat{h}_i(n)$, is generated based on the linear correlation sequence Rrc(n) from which the inter-path interference has been removed, and the feedback signal sf is generated based on a recovered frame body xi(n).

The PN removal unit 30, which may be further included in the channel estimation system 200, removes the frame head 1 (FIG. 1) from the baseband sampled complex signal r(n) based on the symbol synchronization signal ss output from the symbol synchronization unit 120 and upon the CIR sequence $\hat{h}_i(n)$ output from the CIR estimator 130, recovers the cyclical convolution between frame body data in the baseband sampled complex signal r(n) and a current CIR, and outputs the recovered frame body xi(n).

As described above, the channel estimation system 200 may further include the analog-to-digital converter (ADC) 10 and the frequency synchronization/clock recovery unit 20. The analog-to-digital converter 10 samples a received analog signal r(t) at a predetermined sampling frequency fs and outputs a digital signal corresponding to a result of the sampling. Here, the predetermined sampling frequency fs may be 1/Ts and Ts may be Tu/Nc (see FIG. 1).

The frequency synchronization/clock recovery unit 20 compensates for a sampling clock offset and a carrier frequency offset in the digital signal output from the analog-to-digital converter 10 and outputs the baseband sampled complex signal r(n).

The channel estimation system 200 may also further include the FFT unit 40, the DFT unit 70, the channel equalizer 50, the hard-decision unit 80, and the decoding unit 60.

The FFT unit 40 performs a Fast Fourier Transform (FFT) on the frame body xi(n) recovered by the PN removal unit 30 and outputs a fast Fourier transformed signal Xi(k) where "k" denotes an index of a subcarrier.

The DFT unit 70 performs zero-padding on the CIR sequence $\hat{h}_i(n)$ output from the CIR estimator 130, performs discrete Fourier transform (DFT) on the zero-padded sequence, and outputs a discrete Fourier transformed signal $\hat{H}_i(k)$, where "k" denotes an index of a subcarrier).

The channel equalizer 50 performs channel equalization based upon the fast Fourier transformed signal Xi(k) output from the FFT unit 40 and upon the discrete Fourier transformed signal $\hat{H}_i(k)$ output from the DFT unit 70 and outputs an equalized signal $\hat{S}_i(k)$. Here, the equalized signal $\hat{S}_i(k)$ can be obtained by dividing Xi(k) by $\hat{H}_i(k)$.

The hard-decision unit 80 receives the equalized signal $\hat{S}_i(k)$ output from the channel equalizer 50, performs hard-decision on the equalized signal $\hat{S}_i(k)$, and outputs a result of the hard-decision as the feedback signal sf. The channel equalizer 50 may also output the equalized signal $\hat{S}_i(k)$ to the decoding unit 60 and the CIR estimator 130.

The decoding unit 60 receives the equalized signal $\hat{S}_i(k)$ from the channel equalizer 50, performs channel decoding on it and outputs a decoded signal. The decoding unit 60 may perform Viterbi decoding using Forward Error Correction (FEC).

The feedback signal sf input to the CIR estimator 130 may be generated based on the equalized signal $\hat{S}_i(k)$. The feedback signal sf may be a hard-decision signal generated by the hard-decision unit 80 processing the equalized signal $\hat{S}_i(k)$ or the decoded signal generated by the decoding unit 60 processing the equalized signal $\hat{S}_i(k)$.

As described above, the channel estimation system 200 may be included in an OFDM receiver.

Figure 3:
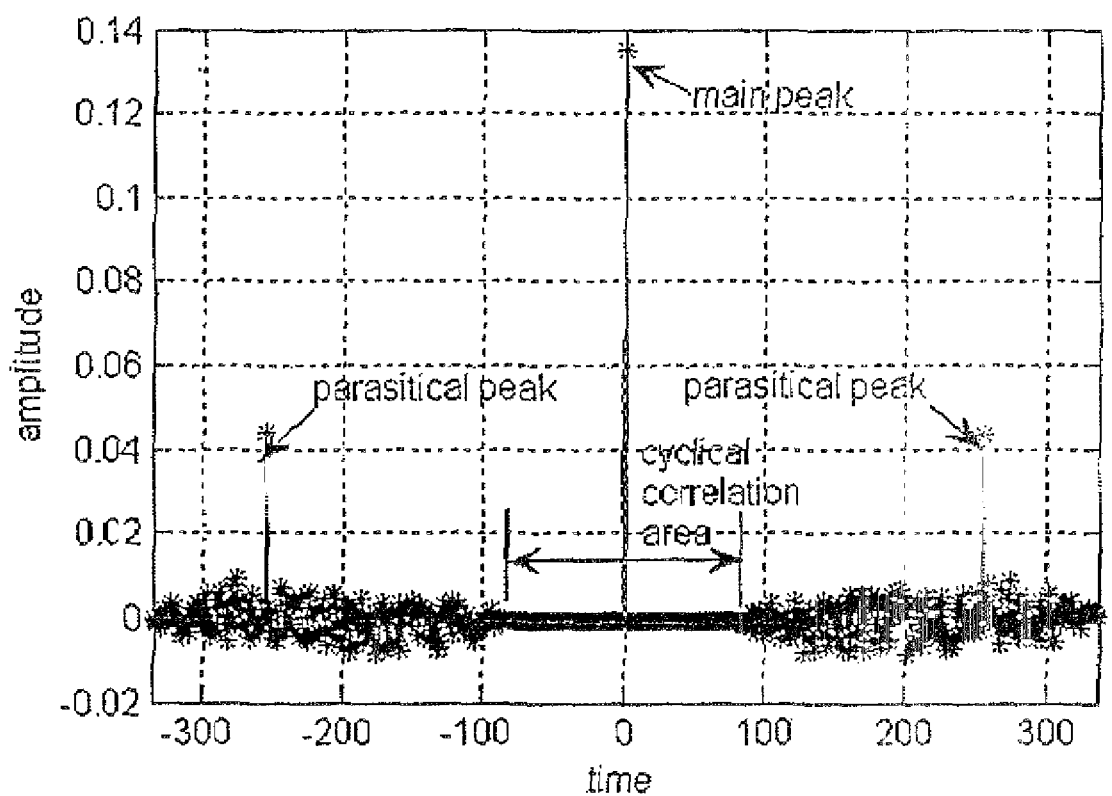
FIG. 3 is a graph illustrating an ideal linear correlation result.

FIG. 3 is a graph illustrating an ideal result of linear correlation in a channel estimation system according to an embodiment of the present invention. In other words, the graph illustrated in FIG. 3 shows a result of linear correlation that does not reflect random-data interference between a frame head and a local PN, which are transmitted through a channel, and channel noise.

FIG. 3 illustrates a result of linear correlation with parameters set as follows: $L_{pre}=83$, $L_{post}=82$, $L_m=255$, and $L_{PN}=420$ with respect to the frame head 1. A main peak (at time=0) and two parasitical peaks are generated (at time=+255 and −255) corresponding to the pre- and post-ambles 2 and 4. The result of the linear correlation in a cyclical correlation area $-L_{pre} \leq \text{time} \leq L_{post}$ (at the center) is the same as a result of a cyclical correlation due to the cyclical extension of the frame head 1. Correlation noise exists outside the cyclical correlation area due to a disruption of the cyclical correlation by the truncated lengths of the pre- and post-ambles 2 and 4.

Figure 4:
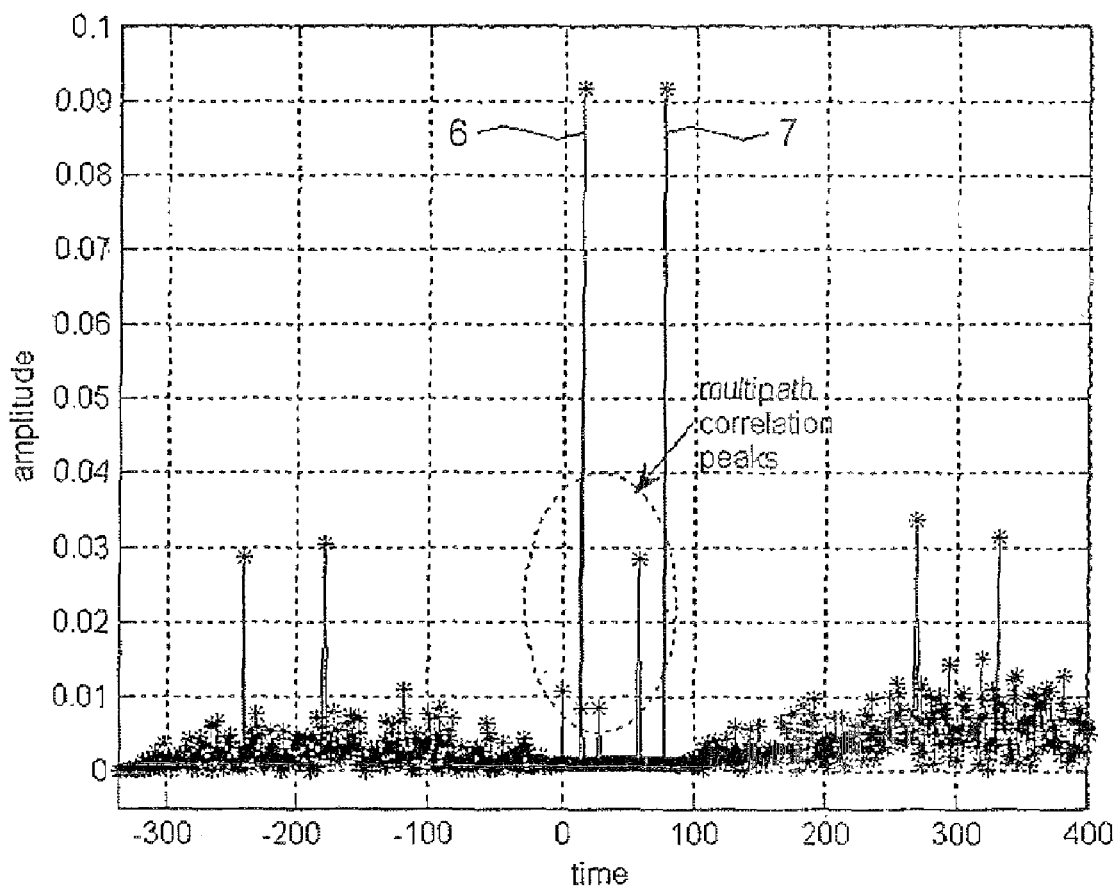
FIG. 4 is a graph illustrating a result of performing a linear correlation when an echo (in a multipath environment) of 0 dB exists within a cyclical correlation area.

FIG. 4 is a graph illustrating a result of performing a linear correlation when an echo (in a multipath environment) of 0 dB exists within a cyclical correlation area. For the purposes of clarity of the description, channel noise is not shown in the graph.

The result of the linear correlation illustrated in FIG. 4 may be considered as the convolution between an approximately ideal correlation (due to the linearity of channel convolution, as illustrated in FIG. 3, and a channel CIR in an actual channel. Accordingly, CIR estimation with respect to the actual channel can be performed by detecting multipath correlation peaks illustrated in FIG. 4. Referring to FIG. 4, since the 0 dB echo (i.e., log the amplitude of a first peak 6 (e.g., 0.09)/the amplitude of a second peak 7 (e.g., 0.09)) exists in the cyclical correlation area (having a minimal nominal amplitude), peaks can be easily detected.

However, in practice, it is difficult to definitely determine the distribution range of the multipath, and therefore, a peak may be erroneously detected at positions (particularly, at parasitic peaks) with high amplitudes.

Figure 5:
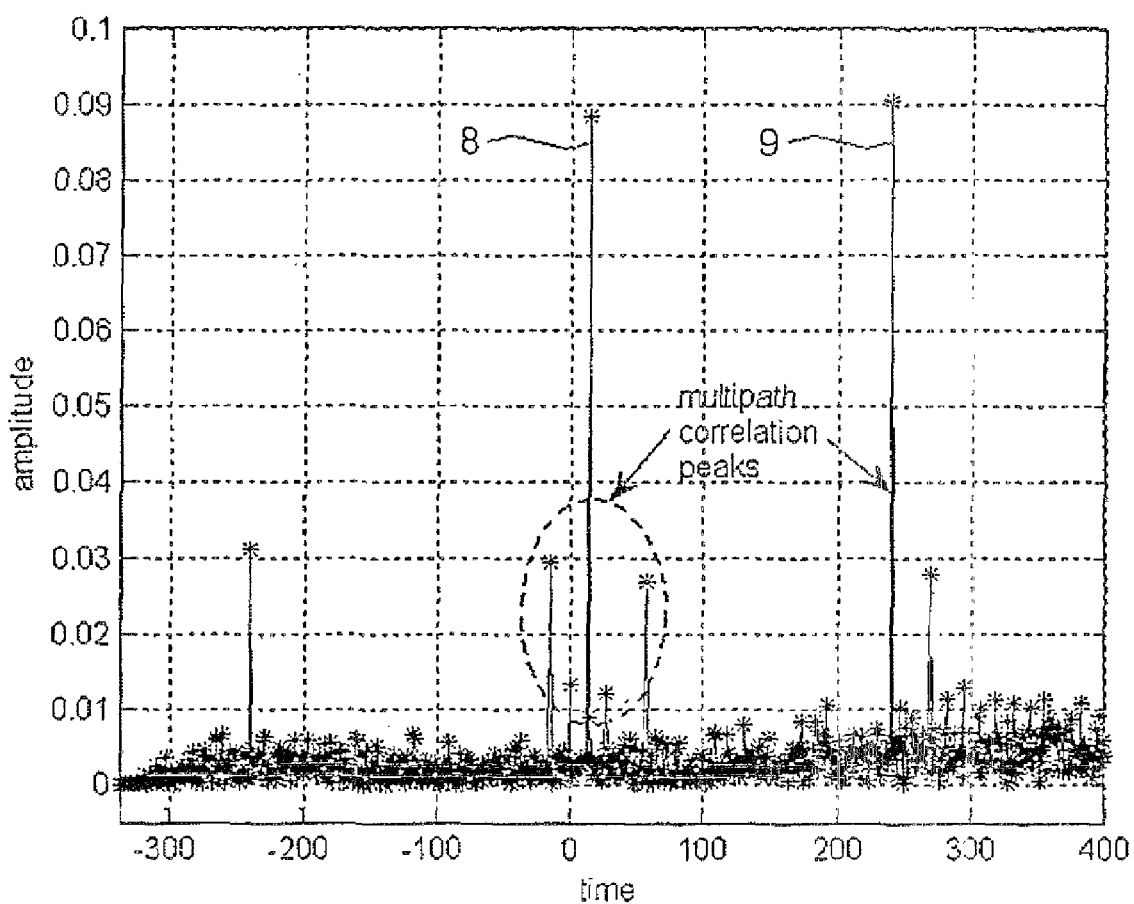
FIG. 5 is a graph illustrating a result of performing a linear correlation when an echo of 0 dB exists outside a cyclical correlation area.

FIG. 5 is a graph illustrating a result of performing a linear correlation when an echo of 0 dB exists outside a cyclical correlation area. Referring to FIG. 5, when the 0 dB echo (i.e., the fourth peak 9 is an echo of the a third peak 8) exists outside the cyclical correlation area, the cyclical correlation area is completely disrupted, and therefore, it is difficult to detect a short, delay due to the multipath or low-amplitude echoes. Accordingly, an embodiment of the present invention uses a method of sequentially detecting a multipath correlation peak and removing the multipath correlation peak from a correlation sequence (i.e., Rrc(n)).

The steps of a method of channel estimation according to an embodiment of the present, invention will be further described with reference to FIG. 2 below.

In step (a), the linear correlator 110 calculates a linear correlation between the baseband sampled complex signal r(n) and the local PN signal C(n) and generates a first correlation sequence Rrc(n). In step (b), the CIR estimator 130 iteratively removes inter-path interference from the first correlation sequence Rrc(n) and generates a first CIR sequence based on a second correlation sequence obtained after the inter-path interference is removed.

The channel estimation according to the current embodiment of the present invention may further include the following steps (c) and (d). In step (c), the channel estimation system 200 generates the feedback signal sf based on the first CIR sequence, the baseband sampled complex signal r(n), and the symbol synchronization signal ss generated based on the first correlation sequence Rrc(n).

In step (d), the CIR estimator 130 removes random-data interference from the second correlation sequence based on the first CIR sequence and the feedback signal sf and generates a second CIR sequence based on a third correlation sequence obtained after the random-data interference is removed.

In other words, the inter-path interference may be removed (step (b)) from the first correlation sequence Rrc(n) (which is generated in step (a)) and a CIR may be estimated based on the inter-path interference free correlation sequence. In addition, the random-data interference is removed from the inter-path interference free correlation sequence (step (d)) and then a CIR may be estimated from the random-data interference tree correlation sequence. Thus, DFE can be performed through steps (c) and (d).

Alternatively, the third correlation sequence generated in step (d) may be set as the first correlation sequence and steps may be iterated from step (b). In other words, when the number of DFE iterations is 0, steps (c) and (d) are omitted. When the number of DFE iterations is 1, each of steps (c) and (d) is performed once.

In step (a), the linear correlator 110 calculates a linear correlation based on the baseband sampled complex signal r(n) and the local PN signal C(n) and generates the first correlation sequence Rrc(n). The first correlation sequence Rrc(n) includes inter-path interference and random-data interference.

In step (b), the CIR estimator 130 removes the inter-path interference from the first correlation sequence Rrc(n). Step (b) includes detecting in the first correlation sequence Rrc(n) a peak having an amplitude equal to or greater than a predetermined threshold $th_j$ and generating an observation vector $A_j$ in substep (b1), generating a CIR sequence based on the observation vector in substep (b2), removing the inter-path interference from the first correlation sequence Rrc(n) based on the CIR sequence in substep (b3), and lowering the predetermined threshold value $th_j$ according to a predetermined reference when the predetermined threshold $th_j$ is greater than an initial threshold value $th_1$ (which may be set greater than a maximum parasitical peak) and returning back to substep (b1) in substep (b4).

In substep (b1), a peak having an amplitude equal to or greater than the predetermined threshold is detected in the first correlation sequence $R_{rc}^{iter=j}(n)$ and the observation vector $A_j=[\hat{a}(\tau_0),\hat{a}(\tau_1), \ldots, \hat{a}(\tau_{Q_j-1})]^T$ is generated. Here, $\hat{a}(\tau_0)$ through $\hat{a}(\tau_{Q_j-1})$ are amplitudes of respective detected peaks, $Q_j$ is the number of the detected peaks, $(\ )^T$ denotes a matrix transpose, and $\tau_0$ through $\tau_{Q_j-1}$ are relative time delays. In addition, the initial threshold $th_1$ of the predetermined threshold $th_i$ may be a value obtained by dividing $\hat{a}(\tau_{max})$ by M, where "j" is an index indicating the number of iterations and is equal to "iter", M is a predetermined number allowing the initial threshold $th_1$ to be greater than a maximum parasitical peak, and the maximum parasitical peak may be $(\hat{a}(\tau_{max}))$ *$L_{pre}/L_{PN}$ or $(\hat{a}(\tau_{max}))$*$L_{post}/L_{PN}$.

In substep (b2), a j-th CIR sequence is generated based on the observation vector $A_j$. When the j-th CIR sequence is generated, a CIR coefficient is calculated corresponding to a correlation peak greater than the predetermined threshold $th_j$. The observation vector may be simultaneously calculated based on the convolution between a channel CIR and an ideal correlation obtained when there is no interference in a frame body, which is known to the CIR estimator 130. To calculate the CIR coefficient simultaneously when the j-th Cir sequence is generated, unified solution may be used.

In substep (b3), the inter-path interference is removed from the correlation sequence $R_{rc}^{iter=j}(n)$ based on the j-th CIR sequence. An inter-path interference free correlation sequence is $R_{rc}^{iter=j+1}(n)$. When the inter-path interference is removed, the inter-path interference may be simultaneously cancelled based on the observation vector in order to reduce an error in peak detection during a subsequent iteration. The theoretical foundation of interference cancellation is based on the convolution relation between a channel CIR and an ideal correlation obtained when there is no interference in a frame body, which is known to the CIR estimator 130.

In substep (b4), when the predetermined threshold $th_j$ is greater than the initial threshold $\hat{a}(\tau_{max})TH_{relative}$, the predetermined threshold $th_j$ is lowered to a predetermined reference. The $TH_{relative}$ is a ratio between a maximum multipath peak and a minimum multipath peak to be detected and the predetermined reference may be defined as $th_j=th_{i+1}/M$. Thereafter, a step of removing inter-path interference is repeated with respect to the correlation sequence $R_{rc}^{iter=j+1}(n)$.

Step (c) may include substeps (c1 to c5), including: removing a frame head from the baseband sampled complex signal r(n) (based on the symbol synchronization signal ss output from the symbol synchronization unit 120 and the CIR sequence $\hat{h}_i(n)$), and recovering a cyclical convolution relation between frame body data in the baseband sampled complex signal r(n) and a current channel CIR to generate a recovered frame body $x_i(n)$ in substep (c1); performing FFT on the recovered frame body xi(n) to generate a fast Fourier transformed signal Xi(k) in substep (c2); performing zero-padding on the CIR sequence $\hat{h}_i(n)$ and performing DFT on a zero-padded sequence $\hat{h}_i(n)$ to generate a discrete Fourier transformed signal $\hat{H}_i(k)$ in substep (c3); performing channel equalization based on the fast Fourier transformed signal $Xi(k)$ and the discrete Fourier transformed signal $\hat{H}_i(k)$ to generate an equalized signal in substep (c4); and performing hard-decision on the equalized signal to generate a hard-decision signal $\hat{S}_i(k)$ in substep (c5). Instead of performing substep (c5), a substep of performing channel decoding on the equalized signal $\hat{S}_i(k)$ to generate a decoded signal may be performed. In other words, the feedback signal sf may result from the hard-decision or from the channel decoding of the equalized signal $\hat{S}_i(k)$.

In step (d), the random-data interference may be cancelled using current frame body data generated through DFE and frame body data in a previous OFDM symbol. The random-data interference can be cancelled based on the convolution between a channel CIR and a correlation between the frame body data obtained through the DFE and a local PN when random-data interference does not exist in the frame head.

The channel estimation according to the above-described exemplary embodiment of the present invention can be expressed by the following algorithm (pseudo code):

---
(1) set $N_{dfe}$, DFE=0;
(2) set $TH_{relative}$, $R_{rc}^{iter=j}(n)$, j=1;
(3) set $th_j = \hat{a}(\tau_{max})/M$;
(4) while $(th_j \geq \hat{a}(\tau_{max})TH_{relative})\{$
  get $A_j$ from $R_{rc}^{iter=j}(n)$;
  generate a CIR sequence based on $A_j$;
  $R_{rc}^{iter=j}(n)$=sequence obtained by canceling inter-path interference from $R_{rc}^{iter=j}(n)$;
  generate a CIR sequence based on $R_{rc}^{iter=j}(n)$;
  $th_j = th_j/M$;
  j=j+1;}
(5) if (DFE<$N_{dfe}$) {
  generate a feedback signal;
  $R_{rc}^{iter=j}(n)$=sequence obtained by canceling random-data interference from $R_{rc}^{iter=j}(n)$;
  return to (2);}.
---

FIG. 6 lists parameters used to simulate a channel estimation system according to an embodiment of the present invention.

FIG. 7 tabulates a profile used to simulate a channel estimation system using the parameters listed in FIG. 6 in a China Test 8th (CT8) channel model.

Figure 8:
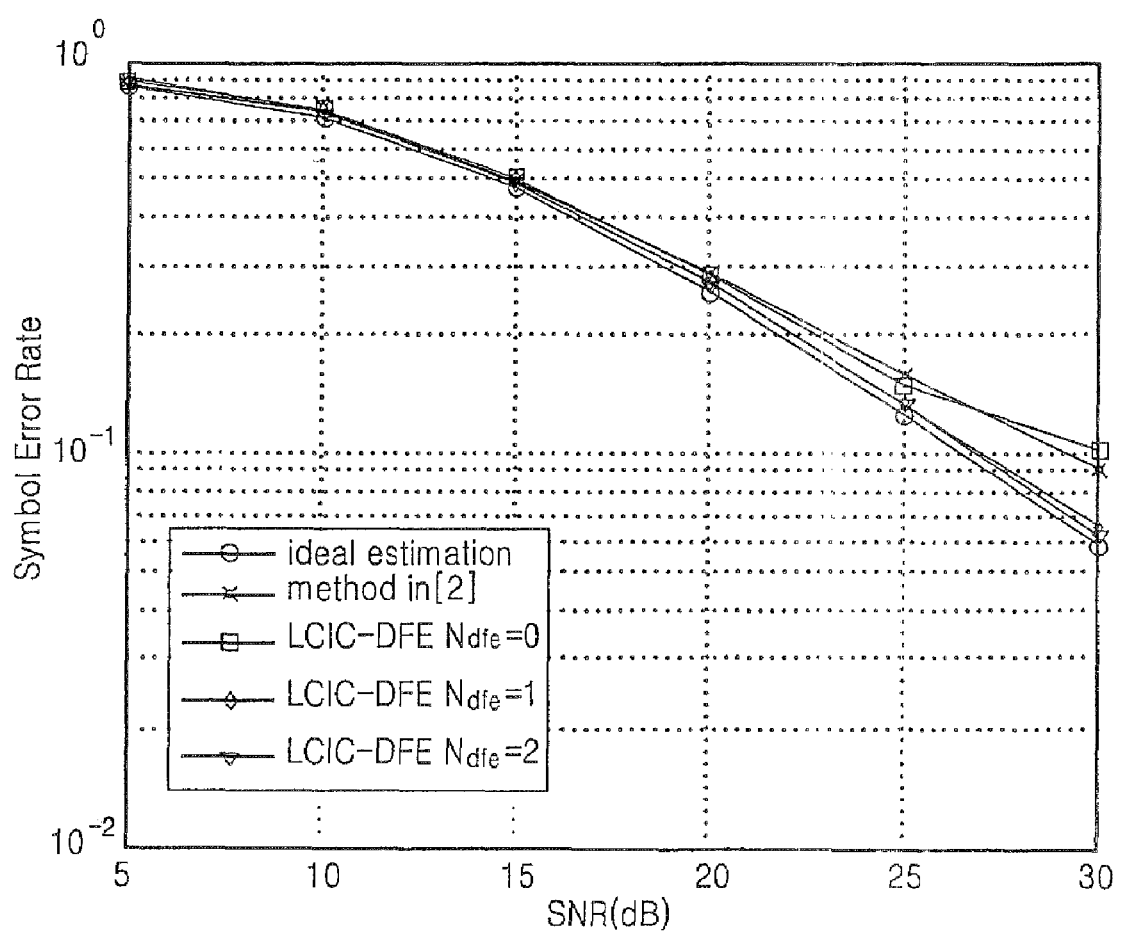
FIG. 8 is a graph illustrating a result of simulating the channel estimation system using the parameters listed in FIG. 6 in a conventional channel model.

FIG. 8 is a graph illustrating simulated results of channel estimation systems using the parameters listed in FIG. 6 in a fixed reception F1 version of DVB-T channel model, which is disclosed in "Digital Video Broadcasting (DVB): Frame Structure, Channel Coding and Modulation for Digital Terrestrial Television" [ETSI, Tech. Rep. EN300 744 v1.1.2, August 1997], Referring to FIG. 8, M=2, and $TH_{relative}$ is 1/8 before random-data interference is cancelled (i.e., in a first DFE iteration) and is 1/16 when the random-data interference is cancelled (i.e., in a second DFE iteration).

Referring to FIG. 8, a symbol error rate (SER) is uniformly lower in the channel estimation performed according to the current embodiment of the present invention (LCIC-DFE Ndfe=1, Ndfe=2) than in the conventional channel estimation (method in [2]) introduced by J. Wang, Z. X. Yang, C. Y. Pan, J. Song, and L. Yang ["Iterative Padding Subtraction of the PN Sequence for the TDS-OFDM over Broadcast Channels", IEEE Trans. Consumer Electronics, vol. 51, no. 4, pp. 1148-1152, November 2005]. In addition, the signal-to-noise ratio (SNR) is increased by about 3 dB at SER=0.1 when one DFE iteration (Ndfe=0) is performed as compared to when only Linear Correlation based Interference Cancellation (LCIC) is used without using DFE.

Figure 9:
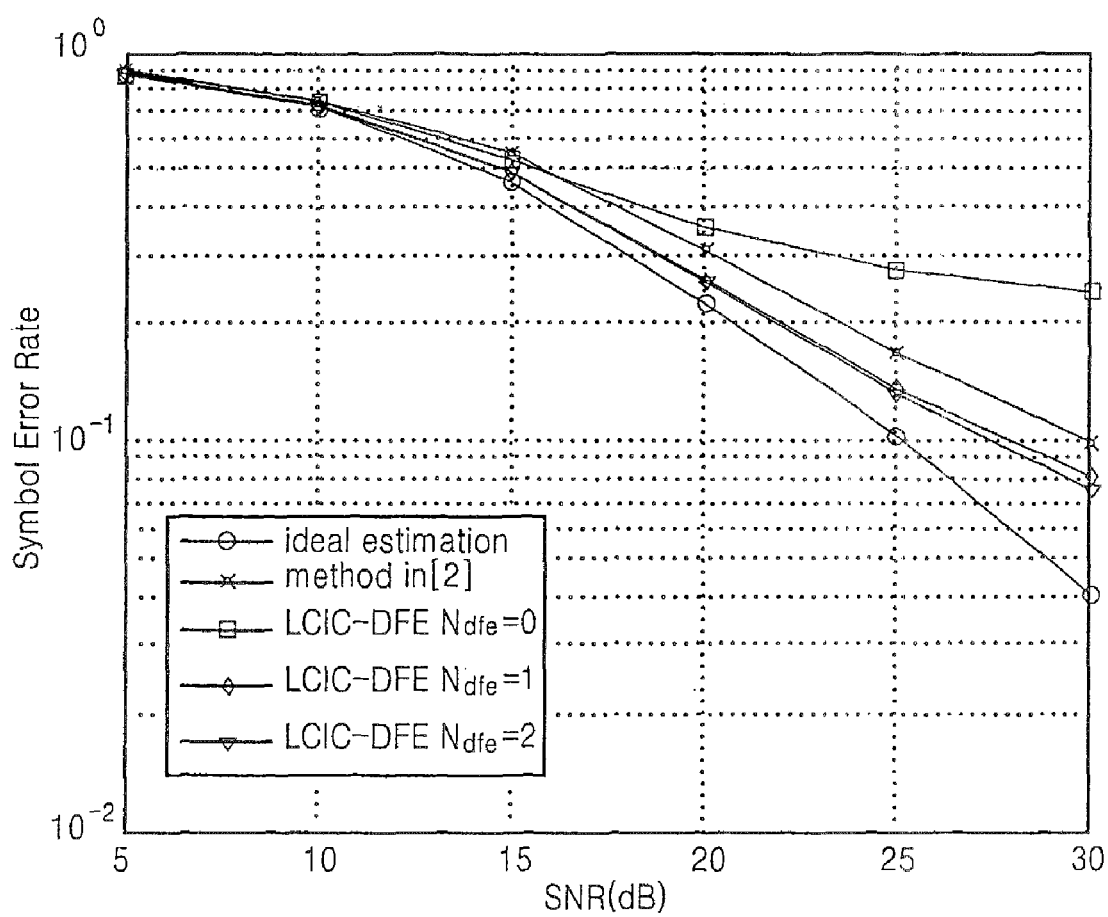
FIG. 9 is a graph illustrating a result of simulating the channel estimation system using the parameters listed in FIG. 6 in the CT8 channel model.

FIG. 9 is a graph illustrating simulated results of channel estimation systems using the same parameters (FIG. 6) as those used in the simulation illustrated in FIG. 8 in the CT8 channel model. Referring to FIGS. 8 and 9, CIR estimation is mainly affected by inter-path interference in the channel model used in the simulations illustrated in FIG. 8, in which a long-delay echo does not exist. Accordingly, the channel estimation is not affected by the number of DFE iterations. However, since the CT8 model used in the simulation illustrated in FIG. 9 has a long-delay and high-amplitude echo, performance is notably different depending upon to the number of DFE iterations.

As described above, according to embodiments of the present invention, a channel CIR can be effectively estimated and the performance of channel CIR estimation can be remarkably improved in an environment having a long-delay and high-amplitude echo. In addition, the present invention has a lower system complexity than a system performing a conventional channel estimation method using a cyclical correlation, thereby facilitating implementation.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A channel estimation method comprising the following steps:
   (a) calculating a linear correlation between a baseband sampled complex signal and a locally stored pseudo-noise PN signal and generating a first correlation sequence;
   (b) iteratively removing inter-path interference from the first correlation sequence, obtaining a second correlation sequence by removing the inter-path interference from the first correlation sequence, and generating a first channel impulse response (CIR) sequence based on the second correlation sequence;
   (c) generating a feedback signal based on the first CIR sequence, the baseband sampled complex signal, and a symbol synchronization signal generated based on the first correlation sequence; and
   (d) removing random-data interference from the second correlation sequence based on the first CIR sequence and the feedback signal, obtaining a third correlation sequence by removing random-data interference from the second correlation sequence, and generating a second CIR sequence based on the third correlation sequence.

2. The channel estimation method of claim 1, further comprising (e) returning to step (b) using the third correlation sequence.

3. The channel estimation method of claim 1, wherein step (b) comprises substeps:
   (b1) detecting a peak having an amplitude equal to or greater than a predetermined threshold in the first correlation sequence and generating an observation vector;
   (b2) generating the first CIR sequence based on the observation vector;
   (b3) removing the inter-path interference from the first correlation sequence based on the CIR sequence; and (b4) lowering the predetermined threshold value to a predetermined reference value when the predetermined threshold is greater than an initial threshold value and returning to substep (b1).

4. The channel estimation method of claim 3, wherein the initial threshold $th_1$ of the predetermined threshold $th_j$ is a value obtained by dividing $â(\tau_{max})$ by M, where "j" is an index indicating the number of iterations of step (b), M is a predetermined number allowing the initial threshold $th_1$ to be greater than a maximum parasitical peak amplitude, and the maximum parasitical peak amplitude is $(â(\tau_{max}))*L_{pre}/L_{PN}$ or $(â(\tau_{max}))*L_{post}/L_{PN}$.

5. The channel estimation method of claim 4, wherein the predetermined reference value is defined as $th_j=th_{j+1}/M$.

6. The channel estimation method of claim 1, wherein step (c) comprises substeps:
   (c1) removing a frame head from the baseband sampled complex signal based on the symbol synchronization signal and the first CIR sequence and recovering a cyclical convolution between frame body data in the baseband sampled complex signal and a current channel CIR to generate a recovered frame body;
   (c2) performing fast Fourier transform on the recovered frame body to generate a fast Fourier transformed signal;
   (c3) performing zero-padding on the CIR sequence and performing discrete Fourier transform on the zero-padded CIR sequence to generate a discrete Fourier transformed signal;
   (c4) performing channel equalization based on the fast Fourier transformed signal and the discrete Fourier transformed signal to generate an equalized signal; and
   (c5) performing hard-decision on the equalized signal to generate a hard-decision signal.

7. The channel estimation method of claim 1, wherein step (c) comprises substeps:
   (c1) removing a frame head from the baseband sampled complex signal based on the symbol synchronization signal and the first CIR sequence and recovering a cyclical convolution between frame body data in the baseband sampled complex signal and a current channel CIR to generate a recovered frame body;
   (c2) performing fast Fourier transform on the recovered frame body to generate a fast Fourier transformed signal;
   (c3) performing zero-padding on the CIR sequence and performing discrete Fourier transform on the zero-padded CIR sequence to generate a discrete Fourier transformed signal;
   (c4) performing channel equalization based on the fast Fourier transformed signal and the discrete Fourier transformed signal to generate an equalized signal; and
   (c6) performing channel decoding on the equalized signal to generate a decoded signal.

8. The channel estimation method of claim 3, wherein substep (b2) comprises calculating a CIR coefficient corresponding to the detected correlation peak greater than the predetermined threshold.

9. The channel estimation method of claim 3, wherein substep (b3) further comprises reducing an error in peak detection during a subsequent iteration by canceling the inter-path interference from the first correlation sequence based on the observation vector.

10. A channel estimation system comprising:
   a linear correlator configured to receive a baseband sampled complex signal and to generate a first correlation sequence by calculating the linear correlation between the baseband sampled complex signal and a locally stored pseudo-noise signal;
   a symbol synchronization unit configured to receive the first correlation sequence and to output an orthogonal frequency division multiplexing (OFDM) symbol synchronization signal; and
   a channel impulse response (CIR) estimator configured to receive the first correlation sequence, the symbol synchronization signal, and a feedback signal, and to estimated a CIR based on the first correlation sequence, the symbol synchronization signal, and the feedback signal, and to output a first CIR sequence corresponding to a result of the estimation,
   wherein the CIR estimator iteratively detects a maximum cross-correlation value in the first correlation sequence,
   iteratively removes the detected maximum cross-correlation value to remove inter-path interference from the first correlation sequence,
   removes random-data interference from a second correlation sequence, obtain by removing the inter-path interference from the first correlation sequence, based on a convolution between the first CIR sequence and the feedback signal, and
   outputs a second CIR sequence based on a third correlation sequence obtained by removing the random-data interference from the second correlation sequence.

11. The channel estimation system of claim 10, further comprising:
   a fast Fourier transform unit configured to perform fast Fourier transform on a recovered frame body output from a pseudo-noise removal unit and to output a fast Fourier transformed signal;
   a discrete Fourier transform unit configured to perform zero-padding on the first CIR sequence output from the CIR estimator, to perform discrete Fourier transform on the zero-padded CIR sequence, and to output a discrete Fourier transformed signal;
   a channel equalizer configured to perform channel equalization based on the fast Fourier transformed signal and the discrete Fourier transformed signal and to output an equalized signal; and, at least one of:
      a hard-decision unit configured to perform hard-decision on the equalized signal received from the channel equalizer and to output a hard-decision signal; and
      a decoding unit configured to perform channel decoding on the equalized signal received from the channel equalizer and to output a decoded signal.

12. The channel estimation system of claim 11, wherein the feedback signal is the hard-decision signal output from the hard-decision unit.

13. A channel estimation method comprising the following steps:
   (a) calculating a linear correlation between a baseband sampled complex signal and a locally stored pseudo-noise PN signal and generating a first correlation sequence;
   (b) iteratively removing inter-path interference from the first correlation sequence, obtaining a second correlation sequence by removing the inter-path interference from the first correlation sequence, and generating a first channel impulse response (CIR) sequence based on the second correlation sequence, wherein step (b) comprises substeps:
      (b1) detecting a peak having an amplitude equal to or greater than a predetermined threshold in the first correlation sequence and generating an observation vector;
      (b2) generating the first CIR sequence based on the observation vector;

(b3) removing the inter-path interference from the first correlation sequence based on the first CIR sequence; and (b4) lowering the predetermined threshold value to a predetermined reference value when the predetermined threshold is greater than an initial threshold value and returning to substep (b1).

14. A channel estimation method comprising the following steps:
(a) calculating a linear correlation between a baseband sampled complex signal and a locally stored pseudo-noise PN signal and generating a first correlation sequence;
(b) iteratively removing inter-path interference from the first correlation sequence, obtaining a second correlation sequence by removing the inter-path interference from the first correlation sequence, and generating a first channel impulse response (CIR) sequence based on the second correlation sequence, wherein step (b) comprises substeps:
  (b1) detecting a peak having an amplitude equal to or greater than a predetermined threshold in the first correlation sequence and generating an observation vector;
  (b2) generating the first CIR sequence based on the observation vector;
  (b3) removing the inter-path interference from the first correlation sequence based on the CIR sequence; and
  (b4) lowering the predetermined threshold value to a predetermined reference value when the predetermined threshold is greater than an initial threshold value and returning to substep (b1).

15. The channel estimation method of claim 14, wherein the initial threshold $th_1$ of the predetermined threshold $th_j$ is a value obtained by dividing $\hat{a}(\tau_{max})$ by M, where "j" is an index indicating the number of iterations of step (b), M is a predetermined number allowing the initial threshold $th_1$ to be greater than a maximum parasitical peak amplitude, and the maximum parasitical peak amplitude is $(\hat{a}(\tau_{max})*L_{pre}/L_{PN}$ or $(\hat{a}(\tau_{max}))*L_{post}/L_{PN}$.

16. The channel estimation method of claim 15, wherein the predetermined reference value is defined as $th_j = th_{j+1}/M$.

17. The channel estimation method of claim 14, wherein substep (b2) comprises calculating a CIR coefficient corresponding to the detected correlation peak greater than the predetermined threshold.

18. The channel estimation method of claim 14, wherein substep (b3) further comprises reducing an error in peak detection during a subsequent iteration by canceling the inter-path interference from the first correlation sequence based on the observation vector.

* * * * *